(12) United States Patent
Sivinski et al.

(10) Patent No.: US 11,197,413 B2
(45) Date of Patent: Dec. 14, 2021

(54) ROW PLANTER WITH ADJUSTABLE GAUGE WHEELS

(71) Applicant: HARVEST INTERNATIONAL, INC., Storm Lake, IA (US)

(72) Inventors: Jeffrey Alan Sivinski, Cherokee, IA (US); Byron J. Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 368 days.

(21) Appl. No.: 16/222,451

(22) Filed: Dec. 17, 2018

(65) Prior Publication Data

US 2019/0116723 A1  Apr. 25, 2019

Related U.S. Application Data

(62) Division of application No. 15/493,382, filed on Apr. 21, 2017, now Pat. No. 10,299,427.

(60) Provisional application No. 62/326,063, filed on Apr. 22, 2016.

(51) Int. Cl.
*A01C 7/20* (2006.01)
*A01C 5/06* (2006.01)

(52) U.S. Cl.
CPC .............. *A01C 7/203* (2013.01); *A01C 5/064* (2013.01)

(58) Field of Classification Search
CPC ....... A01C 7/203; A01C 5/064; A01B 63/006; B60G 2200/46
See application file for complete search history.

(56) References Cited

U.S. PATENT DOCUMENTS

| 2,351,078 | A | * | 6/1944 | Silver | ...................... A01C 7/08 |
| | | | | | 111/59 |
| 3,499,495 | A | * | 3/1970 | Pust | ...................... A01C 5/064 |
| | | | | | 172/536 |
| 4,009,668 | A | | 3/1977 | Brass et al. | |
| 4,317,489 | A | | 3/1982 | Steinbach | |
| 4,404,918 | A | | 9/1983 | Whalen et al. | |
| 4,463,546 | A | | 8/1984 | Day | |

(Continued)

FOREIGN PATENT DOCUMENTS

| WO | 2013101796 A1 | 7/2013 |
| WO | 2015127054 A1 | 8/2015 |

OTHER PUBLICATIONS

Gauge Wheel Arm Pivot Kit, John Deere 1700 Series Planters, RK Products, Inc., 2 pages, Dec. 28, 2017.

(Continued)

*Primary Examiner* — Alicia Torres
(74) *Attorney, Agent, or Firm* — McKee, Voorhees & Sease, PLC

(57) ABSTRACT

Adjustable gauge wheels are provided on a row unit planter adjacent the opening disc. The wheels are adjustable laterally for proper spacing adjacent the discs. The camber of the gauge wheels relative to discs is also adjustable. The lateral adjustment is accomplished via a wear bushing and pivot bushing extending into the wear bushing for each gauge wheel. A grease zerk is provided on the end of each pivot bushing to supply grease to the inside of the adjustment wear bushing. The camber adjustment is accomplished via a slot in the row planter frame and bolts extending into arms on a pivotal member.

24 Claims, 10 Drawing Sheets

(56) References Cited

U.S. PATENT DOCUMENTS

| | | | |
|---|---|---|---|
| 4,520,876 A * | 6/1985 | Peterson | A01B 63/163 |
| | | | 172/26 |
| 4,570,554 A | 2/1986 | Clark | |
| 4,596,200 A | 6/1986 | Gafford et al. | |
| 4,760,806 A | 8/1988 | Bigbee et al. | |
| 5,235,922 A | 8/1993 | Deckler | |
| 5,375,542 A | 12/1994 | Schalfert | |
| 5,427,038 A | 6/1995 | Ege | |
| 5,538,085 A | 7/1996 | Lowe et al. | |
| 5,544,709 A | 8/1996 | Lowe et al. | |
| 5,669,451 A | 9/1997 | Noonan et al. | |
| 5,676,073 A | 10/1997 | Bergland et al. | |
| 5,697,455 A | 12/1997 | Deckler | |
| 5,826,337 A | 10/1998 | Klinkner et al. | |
| 5,845,471 A | 12/1998 | Seegert et al. | |
| 5,896,820 A | 4/1999 | Klinkner et al. | |
| 5,904,107 A | 5/1999 | Kester | |
| 6,041,584 A | 3/2000 | Hohnl | |
| 6,237,696 B1 | 5/2001 | Mayerle | |
| 6,321,667 B1 | 11/2001 | Shoup | |
| 6,752,094 B1 | 6/2004 | Truax | |
| 6,918,343 B2 | 7/2005 | Kester | |
| 7,631,607 B2 | 12/2009 | Vandersnick | |
| 7,669,536 B2 | 3/2010 | Martin | |
| 7,975,629 B1 | 7/2011 | Martin | |
| 8,267,021 B2 | 9/2012 | Mariman et al. | |
| 8,387,715 B2 | 3/2013 | Rylander | |
| 8,544,516 B2 | 10/2013 | Mariman et al. | |
| 8,616,298 B2 | 12/2013 | Rylander | |
| 8,636,077 B2 | 1/2014 | Bassett | |
| 8,863,857 B2 | 10/2014 | Bassett | |
| 8,910,582 B2 | 12/2014 | Mariman et al. | |
| 8,939,095 B2 | 1/2015 | Freed | |
| 9,113,587 B2 | 8/2015 | Hesla | |
| 9,137,940 B2 * | 9/2015 | Wendte | A01C 7/201 |
| 9,148,989 B2 | 10/2015 | Van Buskirk et al. | |
| 9,820,425 B2 * | 11/2017 | Wendte | A01C 5/064 |
| 2005/0072344 A1 | 4/2005 | Kester | |
| 2013/0160684 A1 | 6/2013 | Whalen et al. | |
| 2013/0333599 A1 | 12/2013 | Bassett et al. | |
| 2014/0352991 A1 | 12/2014 | Patwardhan et al. | |
| 2015/0000940 A1 | 1/2015 | Patwardhan et al. | |
| 2015/0230392 A1 | 8/2015 | Schafer et al. | |
| 2015/0271986 A1 | 10/2015 | Sauder et al. | |
| 2015/0359162 A1 | 12/2015 | Needham et al. | |
| 2016/0050837 A1 | 2/2016 | Schaffert et al. | |
| 2017/0156253 A1 | 6/2017 | Kester | |
| 2017/0202130 A1 | 7/2017 | Schoolman et al. | |

OTHER PUBLICATIONS

AA41968/A54179 Planter Gauge Wheel Arm Kit fits John Deere, 2015 Catalog 1 page, Dec. 28, 2017.

* cited by examiner

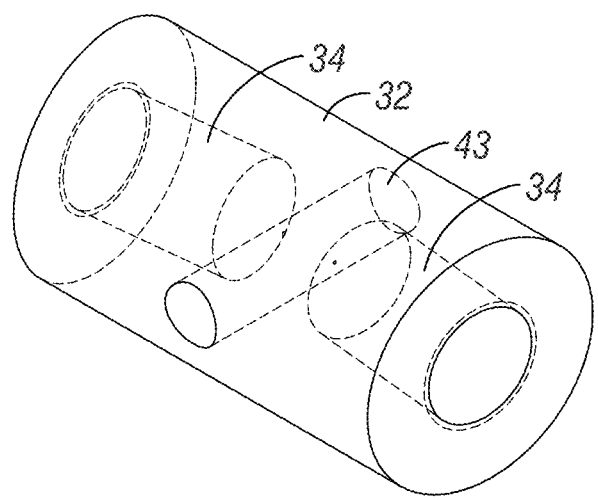
*FIG. 7*
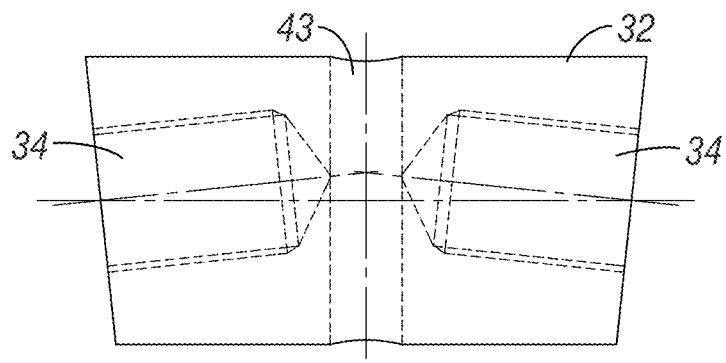
*FIG. 8*
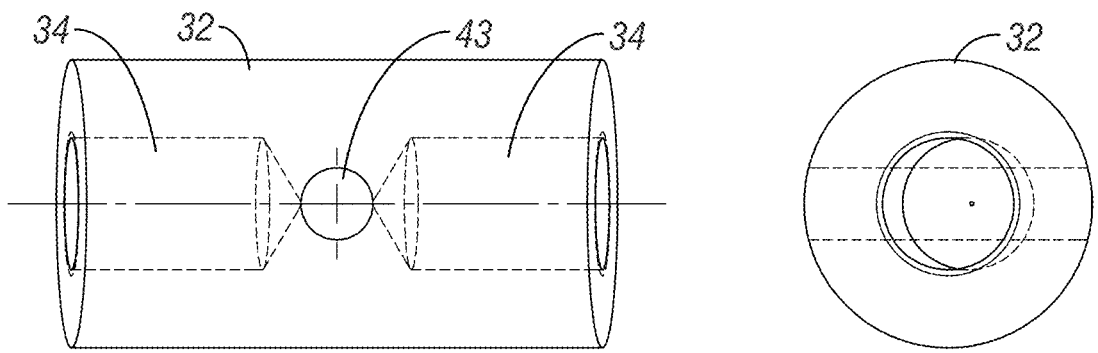
*FIG. 9*  *FIG. 10*

ROW PLANTER WITH ADJUSTABLE GAUGE WHEELS

CROSS-REFERENCE TO RELATED APPLICATION

This is a divisional application of U.S. Ser. No. 15/493,382, filed Apr. 21, 2017, which claims priority to provisional application U.S. Ser. No. 62/326,063, filed Apr. 22, 2016, all of which are herein incorporated by reference in their entirety.

BACKGROUND OF THE INVENTION

Row planter units are precision tools used in farming to plant high tech seeds at uniform depth and spacing to ensure the highest yield potential. To achieve maximum results, the row planter unit must be properly maintained and periodically adjusted.

Row planter units typically include a pair of angularly disposed opening discs to form a V-shaped opening or furrow in the soil into which seeds are planted. The disc openers are followed by a pair of gauge wheels that control the depth of the furrow opened by the discs, and aid in holding the V-shaped profile of the furrow. The gauge wheels are mounted on pivoting arms, which include bushings. The gauge wheels are parallel to and are closely spaced to the discs, or contact the disc openers, when properly positioned, to prevent the buildup of dirt or trash between the gauge wheels and the opening discs. Over time, the bushings wear, which causes the gauge wheel angles to change and allow the gauge wheels to move away from the disc openers. As the bushings wear, the disc openers spread apart, forming a gap between the disc openers. The gap leads to deterioration of the V-shaped seed furrow profile, which is extremely undesirable, and which ultimately adversely affects yield.

One known method for adjusting the gauge wheels to maintain proper positioning is to provide washers or shims which can be added or removed. The washers or shims are positioned adjacent to the upper end of the gauge wheel arm to provide minimum clearance between the gauges wheel and the sides of the discs. This adjustment method necessarily requires removal of the gauge wheel and the gauge wheel arm, such that the shims can be added or removed, as needed. This operation is time consuming and may be difficult if the wheel retaining bolt is corroded or the head is stripped.

Therefore, a primary objective of the present invention is the provision of a row unit having laterally adjustable gauge wheels and wherein the gauge wheels have adjustable camber.

Another objective of the present invention is the provision of a row unit having gauge wheels which can be quickly and easily adjusted for proper positioning relative to the disc openers.

A further objective of the present invention is the provision of a row planter unit having gauge wheels whose lateral position and camber can be adjusted.

Still another objective of the present invention is the provision of a method for quickly and easily adjusting the lateral position of row planter gauge wheels relative to the opening discs.

Yet another objective of the present invention is the provision of a method for quickly and easily adjusting the camber of the gauge wheels on a row planter.

A further objective of the present invention is the provision of a row planter having a wear bushing to permit lateral adjustment of the gauge wheels relative to the opening discs.

Still another objective of the present invention is the provision of a means for adjusting the lateral position and camber orientation of row planter gauge wheels which is economical to manufactured, easy to install and use, and durable and safe in use.

These and other objectives will become apparent from the following description of the invention.

SUMMARY OF THE INVENTION

A row planter gauge wheel assembly is provided with the ability to quickly and easily adjust the gauge wheels relative to the opening discs on the row planter frame. Each gauge wheel is mounted on a pivotal arm. The upper end of each arm is mounted on a bushing assembly, including a pivot bushing extending into a threaded adjustment bushing. A nut on the adjustment bushing can be loosened to allow quick lateral adjustment of each gauge wheel.

The gauge wheel camber can also be adjusted via a rotatable collar mounted on the gauge wheel mounting shaft.

DESCRIPTION OF THE DRAWINGS

FIG. 7 is a perspective view of the gauge wheel mounting shaft.

FIG. 8 is a front elevation view of the mounting shaft.

FIG. 9 is a top plan view of the mounting shaft.

FIG. 10 is an end elevation view from one end of the mounting shaft.

DETAILED DESCRIPTION OF THE INVENTION

Figure 1:
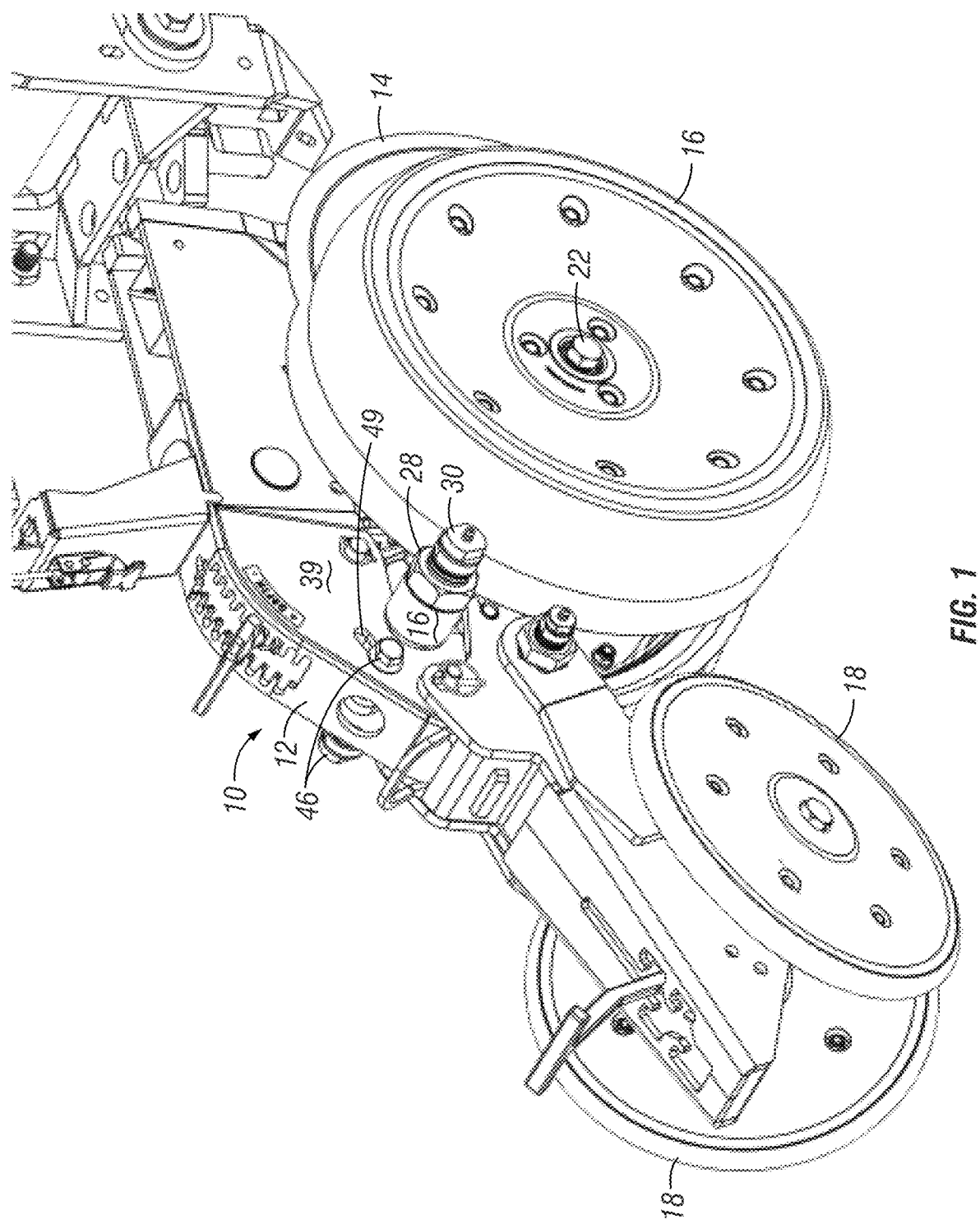
FIG. 1 is a perspective view of a row planter unit with disc openers, gauge wheels, and closing wheels.
Figure 2:
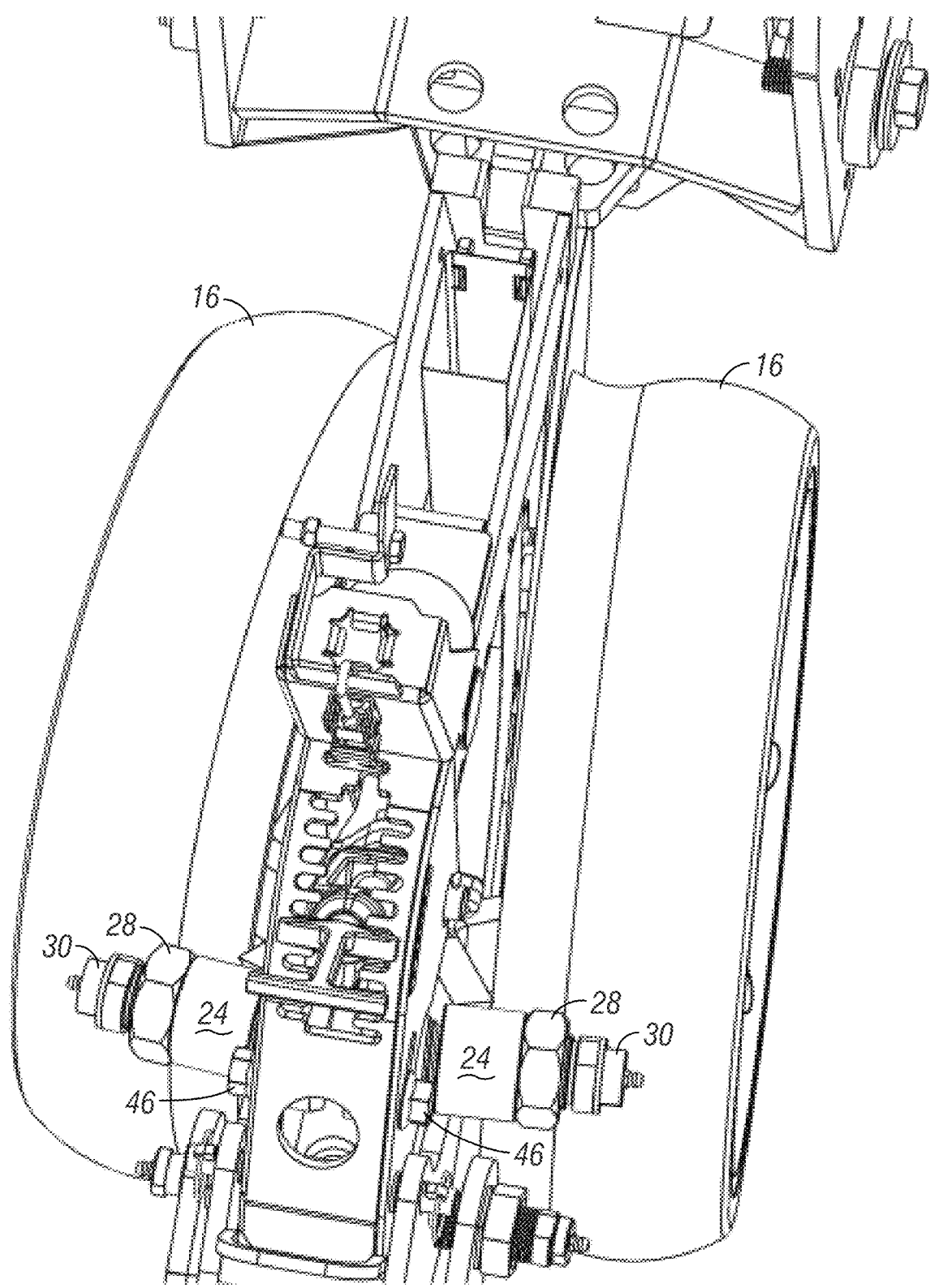
FIG. 2 is a top plan view of the row planter unit shown in FIG. 1.
Figure 3:
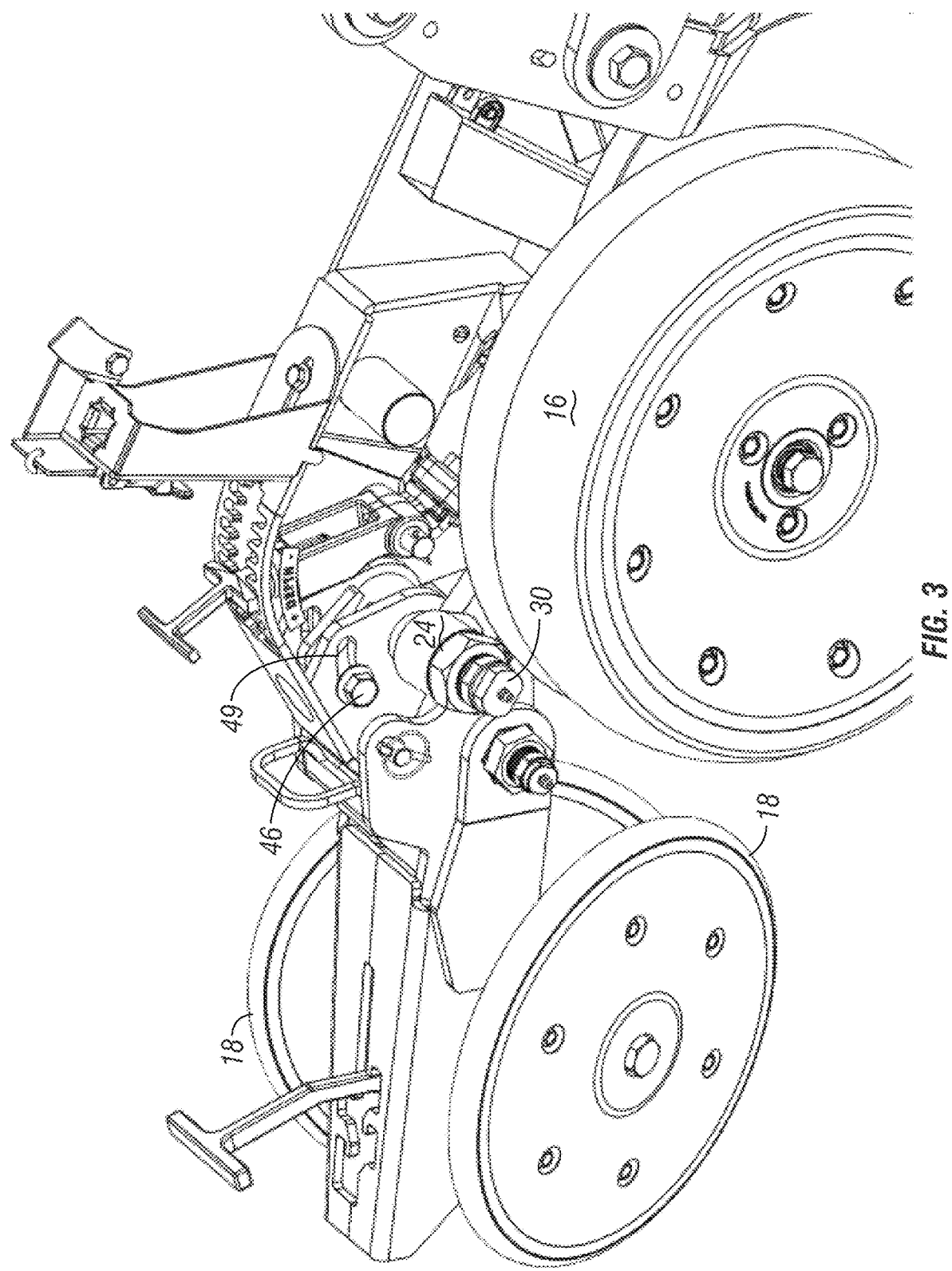
FIG. 3 is another perspective view of the row planter unit shown in FIG. 1.
Figure 4:
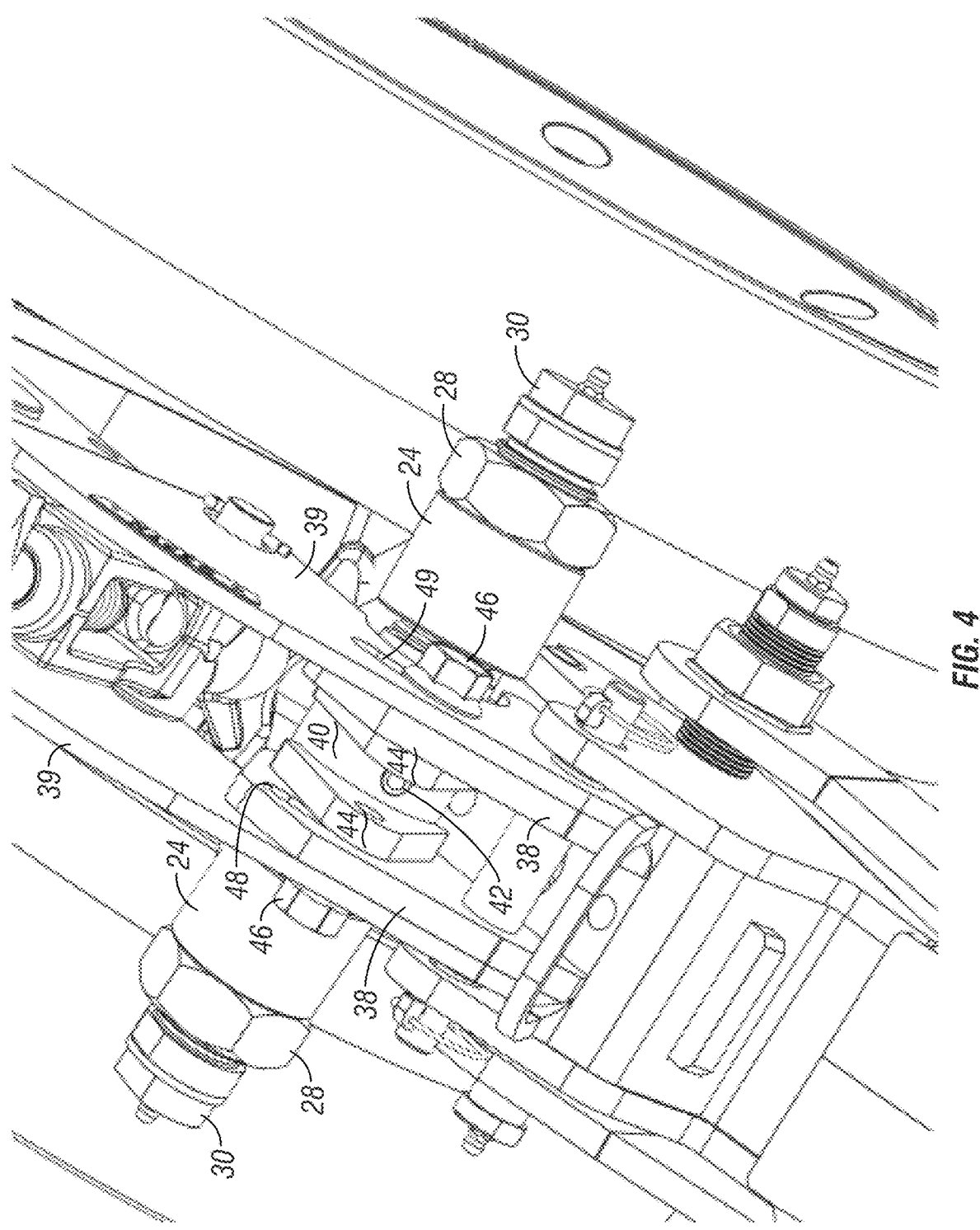
FIG. 4 is an enlarged upper perspective view of the row planter unit shown in FIG. 1.

A row planter unit having the adjustable gauge wheels of the present invention is generally designated in the drawings by the reference numeral 10. The unit 10 includes a frame 12, a pair of disc openers (or opening discs) 14, a pair of gauge wheels 16, and a pair of closing wheels 18. The discs 14 and closing wheels 18 are conventional, and do not form a part of the present invention.

Applicant's invention is directed towards the gauge wheels 16, and more specifically, to the ability to adjust the camber and the lateral position of the gauge wheels 16.

Figure 5:
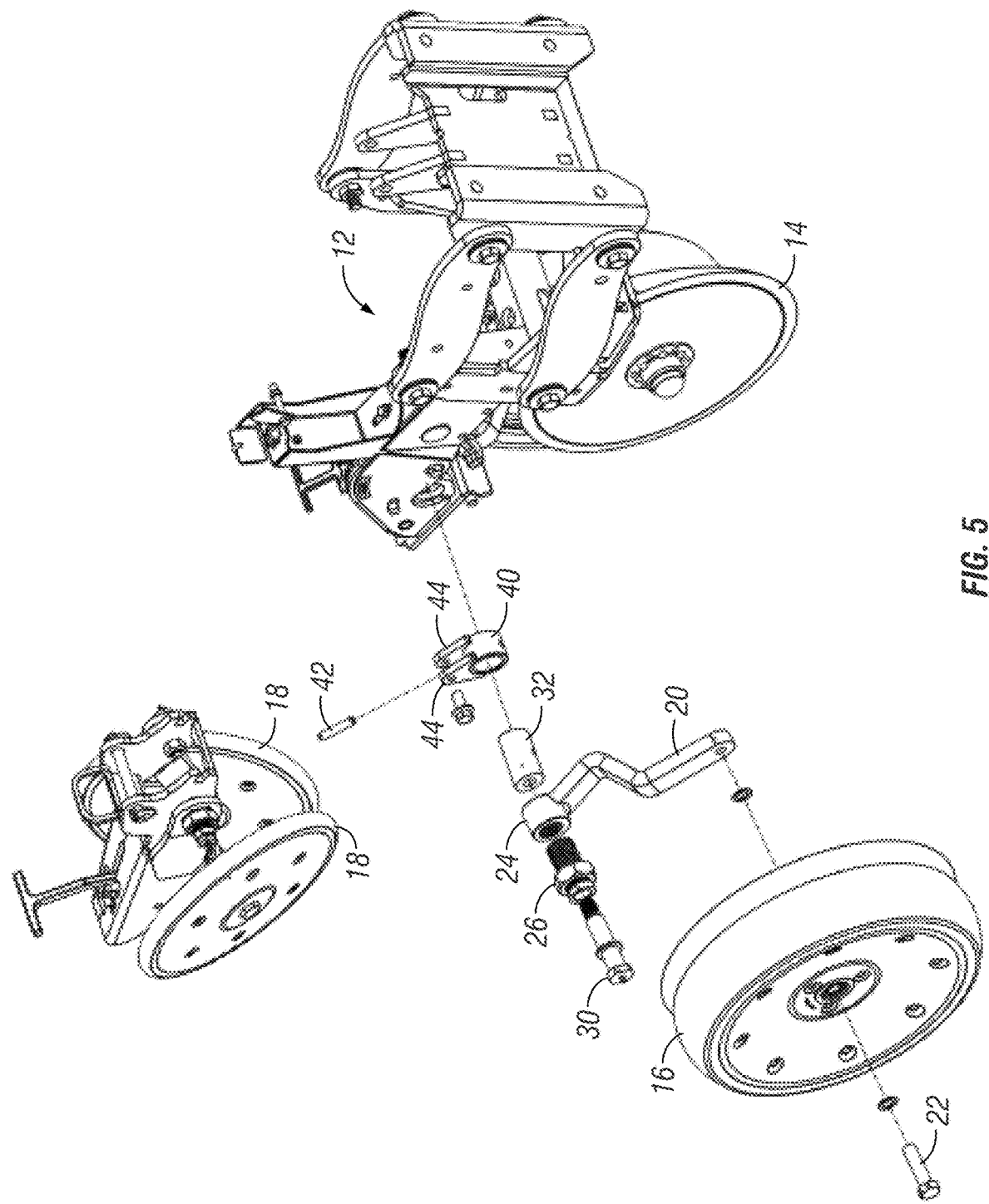
FIG. 5 is a partially exploded perspective view of the row planter unit shown in FIG. 1.

As best seen in the partial exploded view of FIG. 5, each gauge wheel 16 is mounted on a lower end of an arm 20 via a bolt 22 which defines the rolling axis for the wheel. The upper end of the arm 20 is adjustably coupled to the frame 12 by a bushing assembly. More particularly, the upper end of the arm 20 has an internally threaded collar 24 which threadably receives a lateral adjustment bushing 26. The bushing 26 has external threads to threadably mate with the internal threads on the collar 24 of the arm 20. A lock nut 28 on the bushing 26 fixes the threaded position of the bushing 26 in the collar 24 of the arm 20, thereby allowing the lateral position of the gauge wheel 16 to be adjusted relative to the opening disc 14.

A pivot bushing 30 extends through the adjustment bushing 26 and has an inner end which is threadably received within a mounting shaft 32. The pivot bushing 30 allows the adjustment bushing 26, the fixed arm 20 and the gauge wheel 16 to pivot about the axis of the bushing 30 as the row unit travels through the field.

Preferably, the bushing 30 is hollow, with an end grease zerk, which allows the inside of the bushing 26 to be greased, thereby minimizing wear between the bushings 26 and 30.

The opposite gauge wheel is similarly mounted to the opposite end of the mounting shaft 32 via a mirror image arm 20, adjustment bushing 26, and pivot bushing 30.

As seen in FIG. 8, the shaft 32 has internally threaded bores 34 on each end which are angularly disposed with respect to each other. The bores 34 receive the threaded ends 33 of the pivot bushing 30. While FIG. 8 shows the angular orientation of the bores 34 to be 6 degrees relative to horizontal, it is understood that this angle can be increased or decreased without departing from the scope of the present invention.

Figure 6:
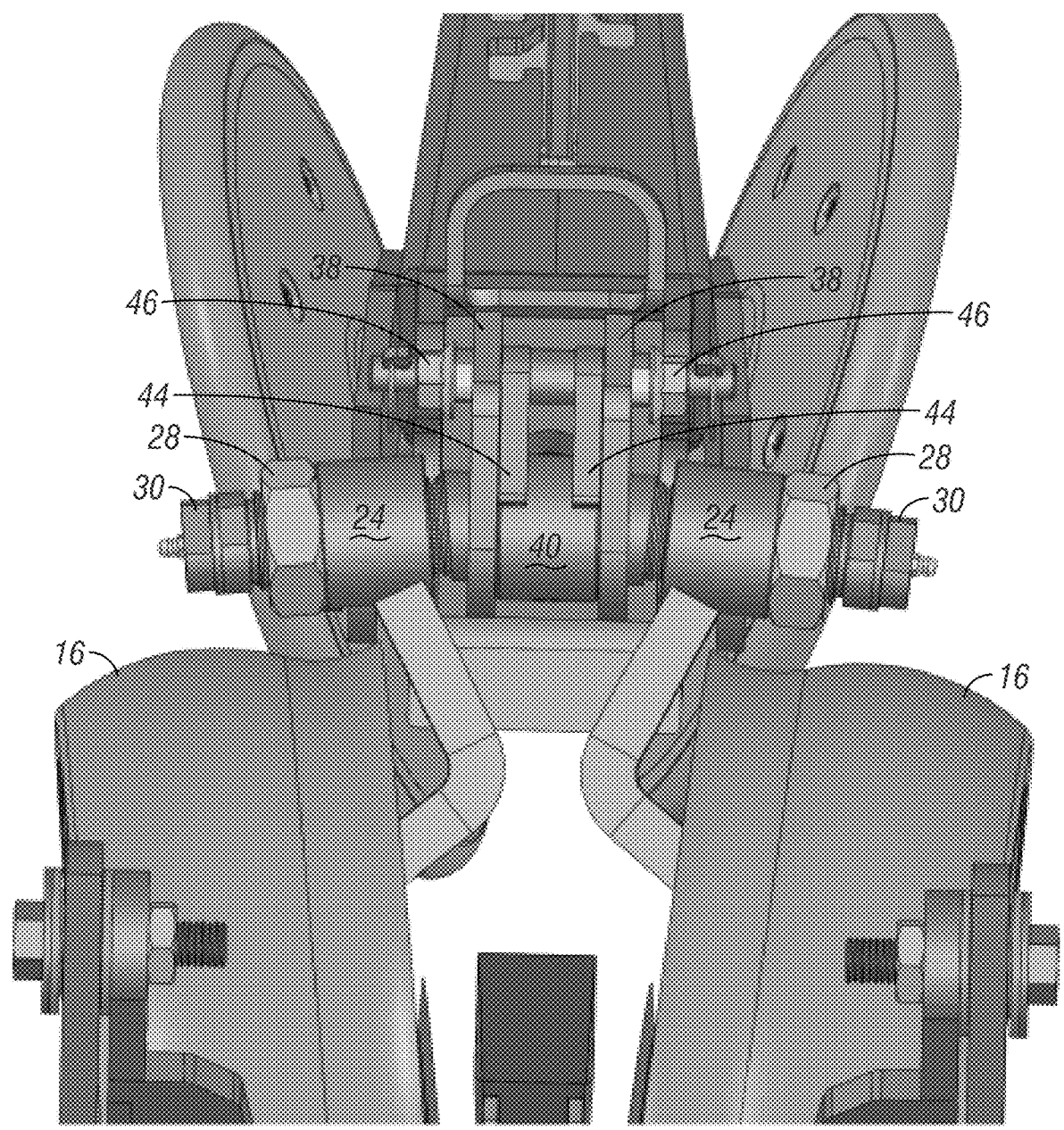
FIG. 6 is an enlarged plan view showing the means for lateral adjustment and camber adjustment of the gauge wheels of the row planter unit.

As seen in FIG. 6, the frame 12 includes a pair of spaced apart, longitudinally extending inner plates 38 and outer plates 39. A tubular member 40 resides between the plates 38. The mounting shaft 32 extends through the tubular member 40, and is affixed thereto by a roll pin 42. The tubular member 40 has a pair of arms 44 welded thereto and extending rearwardly between the plates 38. A pair of bolts 46 extend through aligned slots 48, 49 in the inner and outer plates 38, 39 and are threadably received in the arms 44 of the tubular member 40. When the bolts 46 are loosened, the tubular member 40 can be rotated about its axis, thereby adjusting the camber of the gauge wheels 16. The bolts 46 are tightened to maintain the selected camber position of the gauge wheels 16.

Figure 11:
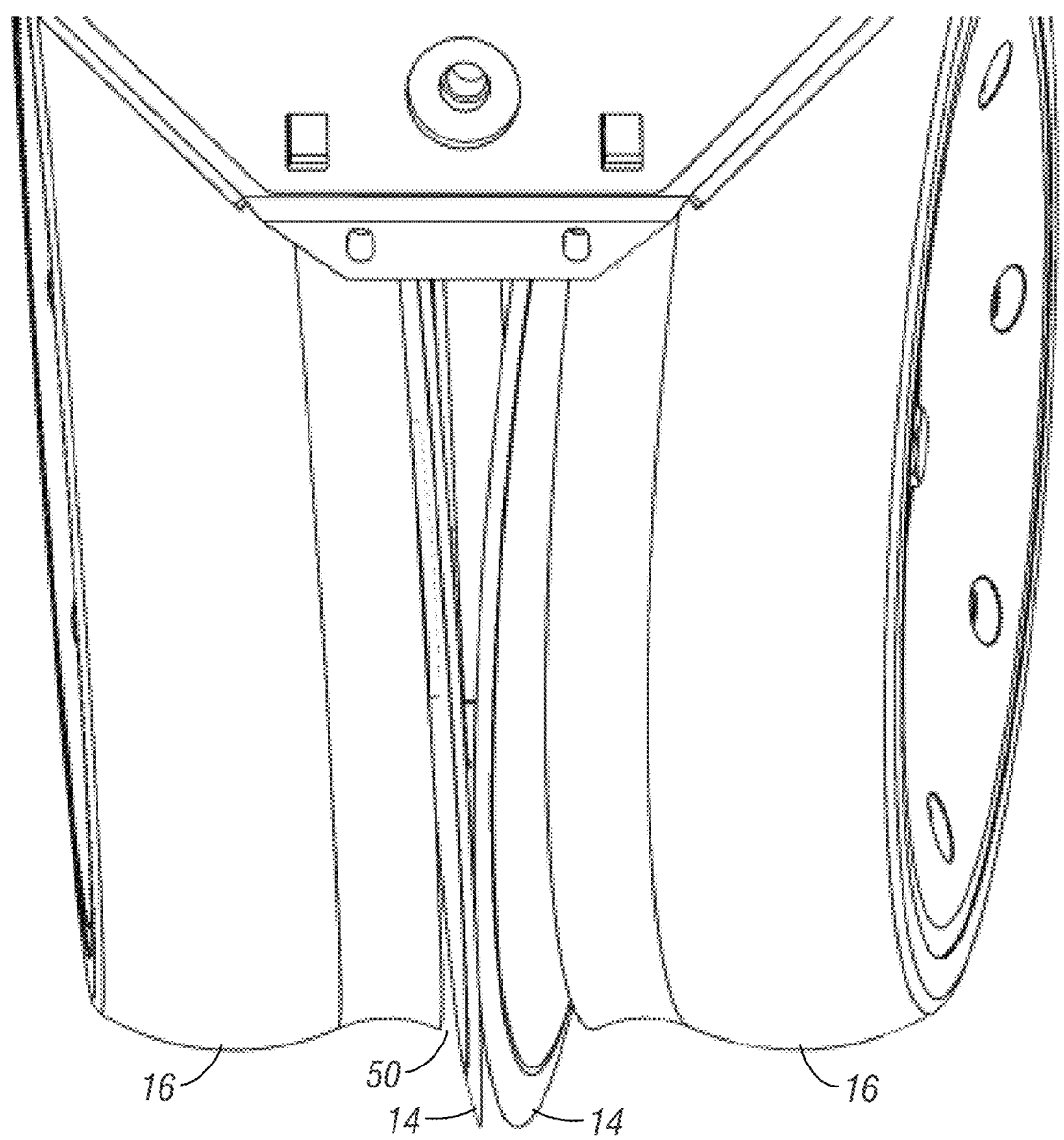
FIG. 11 is a front elevation view showing the gauge wheels in proper position relative to the disc openers.
Figure 12:
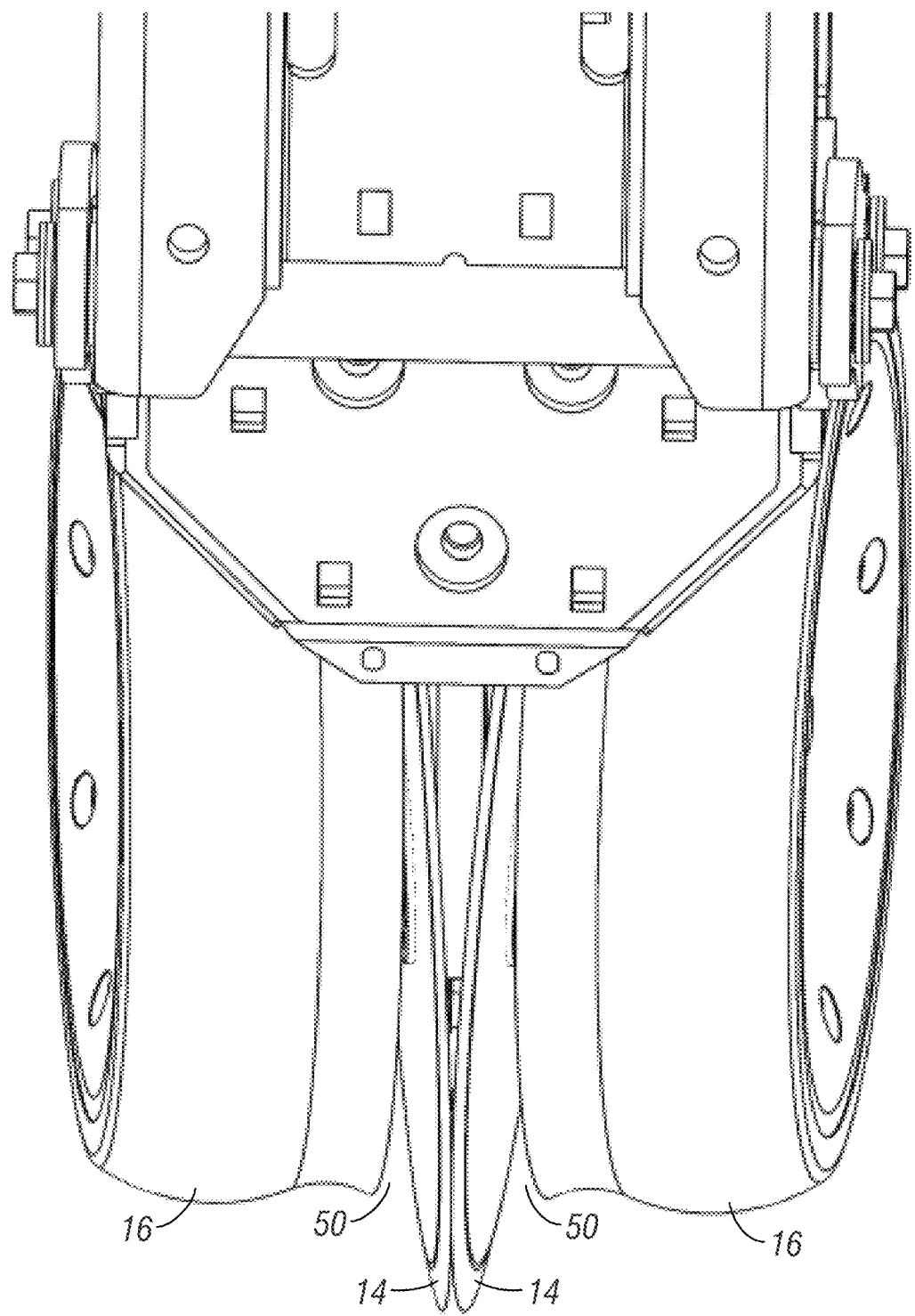
FIG. 12 is a front elevation view showing the position of the gauge wheels after bushing wear, with a gap between the gauge wheels and the opener discs.
Figure 13:
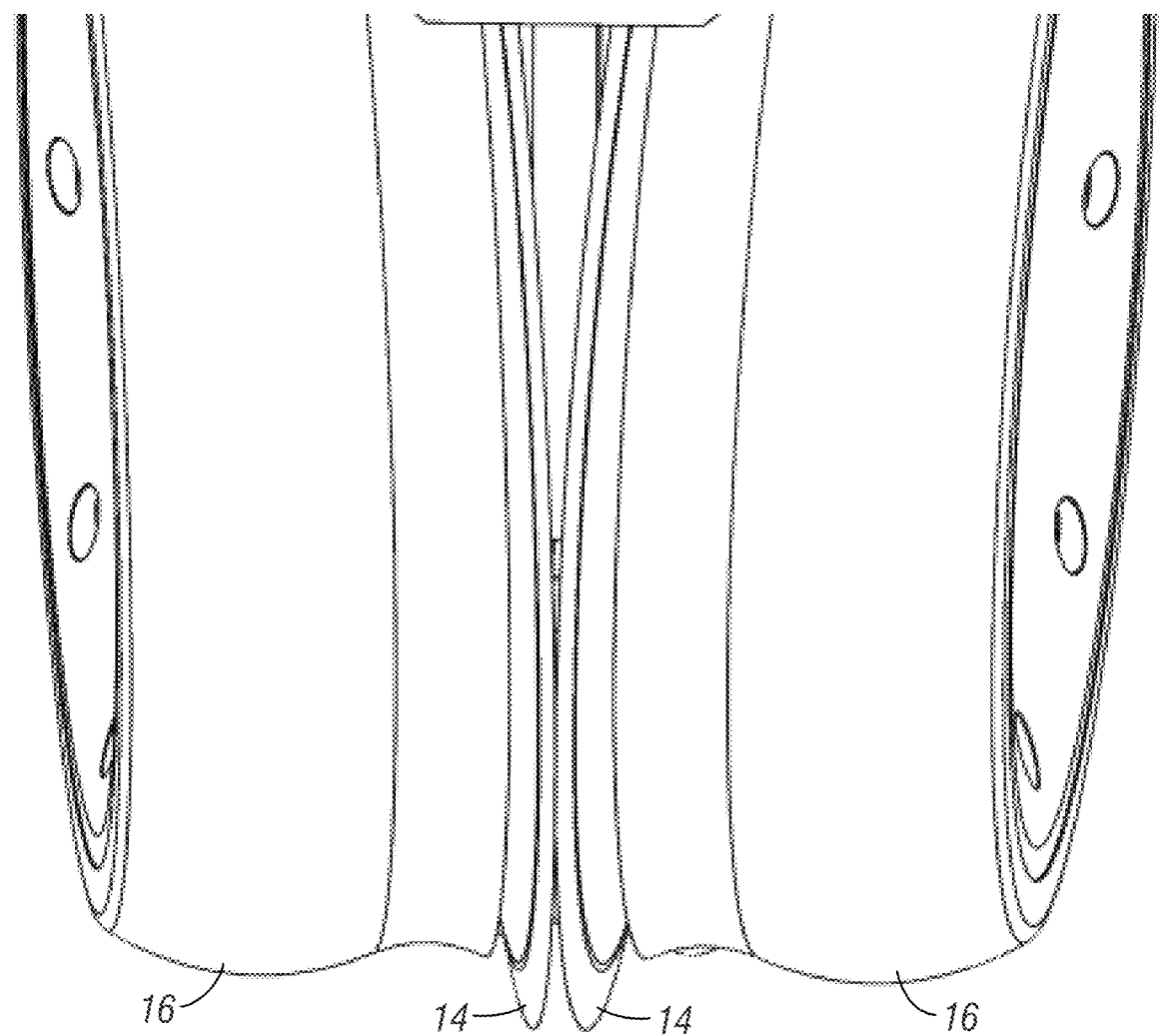
FIG. 13 is another front elevation view showing correctly adjusted gauge wheels parallel to the disc openers.

FIG. 13 shows the gauge wheels 16 properly adjusted so as to be parallel to and closely spaced to, or lightly engaging the opening discs 14. In comparison, FIGS. 11 and 12 show the gauge wheels on worn bushings before any adjustments, with gaps 50 between the gauge wheels 16 and the discs 14. The gaps 50 cause mis-formed or deterioration of the seed furrow, and thus reduced yield. Dirt and trash can also accumulate in the gaps 50. The properly adjusted gauge wheels 16, as shown in FIG. 13, maintain proper furrow creation, for proper seed placement and enhanced yield, and eliminate or minimize buildup of dirt and trash.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

The invention claimed is:

1. A row planter, comprising:
a frame,
a pair of discs on the frame to form a furrow in the ground;
a pair of gauge wheels mounted on the frame by a pair of gauge wheel arms;
each gauge wheel having an adjustable camber; and
a tubular member having a pair of arms bolted to the frame via a slot in the frame;
the tubular member being operatively connected to both gauge wheel arms; and
a pair of bolts extending into the arms of the tubular member and through the slot to define a pivot axis and thereby permit the camber adjustment of the gauge wheels when the bolts are loosened.

2. The row planter of claim 1 wherein the gauge wheels are laterally adjustable relative to the discs.

3. The row planter of claim 1 wherein the tubular member resides between the gauge wheels.

4. The row planter of claim 1 wherein each of the gauge wheels includes an adjustment bushing connected to one end of the gauge wheel arm to allow lateral adjustment of the wheels.

5. The row planter of claim 4 wherein each gauge wheel includes a pivot bushing extending into the adjustment bushing.

6. The row planter of claim 5 wherein each pivot bushing includes a grease zerk.

7. The row planter of claim 5 wherein each pivot bushing is threadably coupled to a center shaft fixed to and extending from the tubular member.

8. The row planter of claim 5 wherein each pivot bushing pivots about a non-horizontal axis.

9. A row planter, comprising:
a frame with a pair of gauge wheels;
a pair of arms to mount the gauge wheels to the frame;
each arm having a first end to which one gauge wheel is bolted and a second end coupled to the frame so that the angular orientation of the arm to the frame is variable such that the gauge wheel has an adjustable camber; and
a tubular member mounted to slots in the frame and the second end of each arm being operatively connected to the tubular member such that movement of the tubular member relative to the slots adjusts the camber of the gauge wheels.

10. The row planter of claim 9 further comprising bolts extending through the slots and into arms on the tubular member to fix the tubular member in a selected position when the bolts are tightened.

11. The row planter of claim 10 wherein the tubular member has a pair of arms to threadably receive the bolts.

12. The row planter of claim 9 wherein the gauge wheels are laterally adjustable.

13. The row planter of claim 9 wherein the camber of the gauge wheels is adjusted in unison.

14. A row planter, comprising:
a frame with a pair of gauge wheels;
a pair of arms to mount the gauge wheels to the frame;
each arm having a first end to which one gauge wheel is bolted and a second end coupled to the frame so that the angular orientation of the arm to the frame is variable such that the gauge wheel has an adjustable camber;
the gauge wheels being laterally adjustable; and
lateral adjustment bushing threadably extending into the second end of the arm.

15. The row planter of claim 14, further comprising a tubular member mounted to slots in the frame and the second end of each arm being operatively connected to the tubular member, and wherein the tubular member is movable relative to the slots to adjust the camber of the gauge wheel.

16. The row planter of claim 15 further comprising bolts extending through the slots and into the tubular member to fix the tubular member in a selected position when the bolts are tightened, and the tubular member has a pair of arms to threadably receive the bolts.

17. The row planter of claim 14, comprising a pivot bushing extending through the adjustment bushing for receipt in a mounting shaft operatively connected to the frame.

18. The row planter of claim 14 wherein the cambers of the gauge wheels are adjusted in unison.

19. A row planter, comprising:
a frame with a pair of gauge wheels;
a pair of arms to mount the gauge wheels to the frame;
each arm having a first end to which one gauge wheel is bolted and a second end coupled to the frame so that the angular orientation of the arm to the frame is variable such that the gauge wheel has an adjustable camber;
a tubular member mounted to slots in the frame and the second end of each arm being operatively connected to the tubular member such that movement of the tubular member relative to the slots adjusts the camber of the gauge wheels;
the gauge wheels are laterally adjustable; and
a lateral adjustment bushing threadably extending into the second end of the arm.

20. The row planter of claim 19 further comprising a pivot bushing extending through the adjustment bushing for receipt in a mounting shaft extending from the tubular member.

21. The row planter of claim 19 wherein the tubular member is movable along the slot to adjust the camber of the gauge wheel.

22. The row planter of claim 19 further comprising bolts extending through the slots and into arms on the tubular member to fix the tubular member in a selected position when the bolts are tightened.

23. The row planter of claim 19 wherein the tubular member has a pair of arms to threadably receive the bolts.

24. The row planter of claim 19 wherein the camber of the gauge wheels is adjusted in unison.

* * * * *